US012580666B2

(12) United States Patent
Sunila et al.

(10) Patent No.: US 12,580,666 B2
(45) Date of Patent: Mar. 17, 2026

(54) COMPUTER IMPLEMENTED METHOD FOR ANALYZING OPERATION OF A CELL OF A COMMUNICATIONS NETWORK

(71) Applicant: Elisa Oyj, Helsinki (FI)

(72) Inventors: Karri Sunila, Helsinki (FI); Riku Ertimo, Helsinki (FI)

(73) Assignee: Elisa Oyj, Helsinki (FI)

( * ) Notice: Subject to any disclaimer, the term of this patent is extended or adjusted under 35 U.S.C. 154(b) by 349 days.

(21) Appl. No.: 18/037,376

(22) PCT Filed: Nov. 8, 2021

(86) PCT No.: PCT/FI2021/050754
§ 371 (c)(1),
(2) Date: May 17, 2023

(87) PCT Pub. No.: WO2022/106751
PCT Pub. Date: May 27, 2022

(65) Prior Publication Data
US 2024/0007200 A1    Jan. 4, 2024

(30) Foreign Application Priority Data
Nov. 23, 2020    (FI) ...................................... 20206190

(51) Int. Cl.
*H04B 17/17* (2015.01)
*H04B 17/26* (2015.01)
(52) U.S. Cl.
CPC ............. *H04B 17/17* (2015.01); *H04B 17/26* (2015.01)
(58) Field of Classification Search
CPC ........ H04B 17/17; H04B 17/26; H04B 17/20; H04B 7/08; H04W 24/04; H04W 24/08;
(Continued)

(56) References Cited

U.S. PATENT DOCUMENTS

2009/0141623 A1* 6/2009 Jung ................... H01Q 21/205
455/562.1
2010/0120415 A1 5/2010 Urquhart et al.
(Continued)

FOREIGN PATENT DOCUMENTS

EP        1082827 B1    6/2004
WO    2012067554 A1    5/2012
WO    2012119269 A1    9/2012

OTHER PUBLICATIONS

European Patent Office, International Search Report and the Written Opinion of the International Searching Authority or the Declaration, Application No. PCT/FI2021/050754, Mailed Feb. 9, 2022, 16 pages.

(Continued)

*Primary Examiner* — Obaidul Huq
(74) *Attorney, Agent, or Firm* — Ziegler IP Law Group, LLC.

(57)    ABSTRACT

A computer implemented method for analyzing operation of a cell of a communications network includes collecting data with measurement samples of signal level performance indicators from multiple cells of the communications network; calculating a characteristic value for a signal level performance indicator for a first cell type based on the collected data, wherein a part of the best measurement samples of the signal level performance indicator of the first cell type are taken into account in the calculation of the characteristic value; calculating a difference between the calculated characteristic value and a measurement sample of signal level performance indicator of a first cell of the first cell type; and providing output information indicating that an antenna system of the first cell is operating incorrectly in response to detecting that the calculated difference is greater than a preset threshold.

18 Claims, 4 Drawing Sheets

(58) Field of Classification Search
    CPC ..... H04W 24/10; H04W 24/02; H04W 36/30;
                                            H01Q 1/246
    USPC ....................................... 370/310, 328, 329
    See application file for complete search history.

(56)                    References Cited

U.S. PATENT DOCUMENTS

| | | |
|---|---|---|
| 2016/0135062 A1 | 5/2016 | Lee et al. |
| 2016/0165462 A1 | 6/2016 | Tan et al. |
| 2016/0165472 A1 | 6/2016 | Gopalakrishnan et al. |
| 2018/0145744 A1* | 5/2018 | Petranovich ....... H04B 7/18515 |
| 2018/0241484 A1 | 8/2018 | Larsson et al. |
| 2020/0274626 A1 | 8/2020 | Leaf et al. |
| 2022/0078643 A1* | 3/2022 | Vierimaa .............. H04B 17/15 |

OTHER PUBLICATIONS

Finnish Patent and Registration Office, Search Report, Application
No. 20206190, Mailed Jun. 16, 2021, 2 pages.

* cited by examiner

Figure 3:
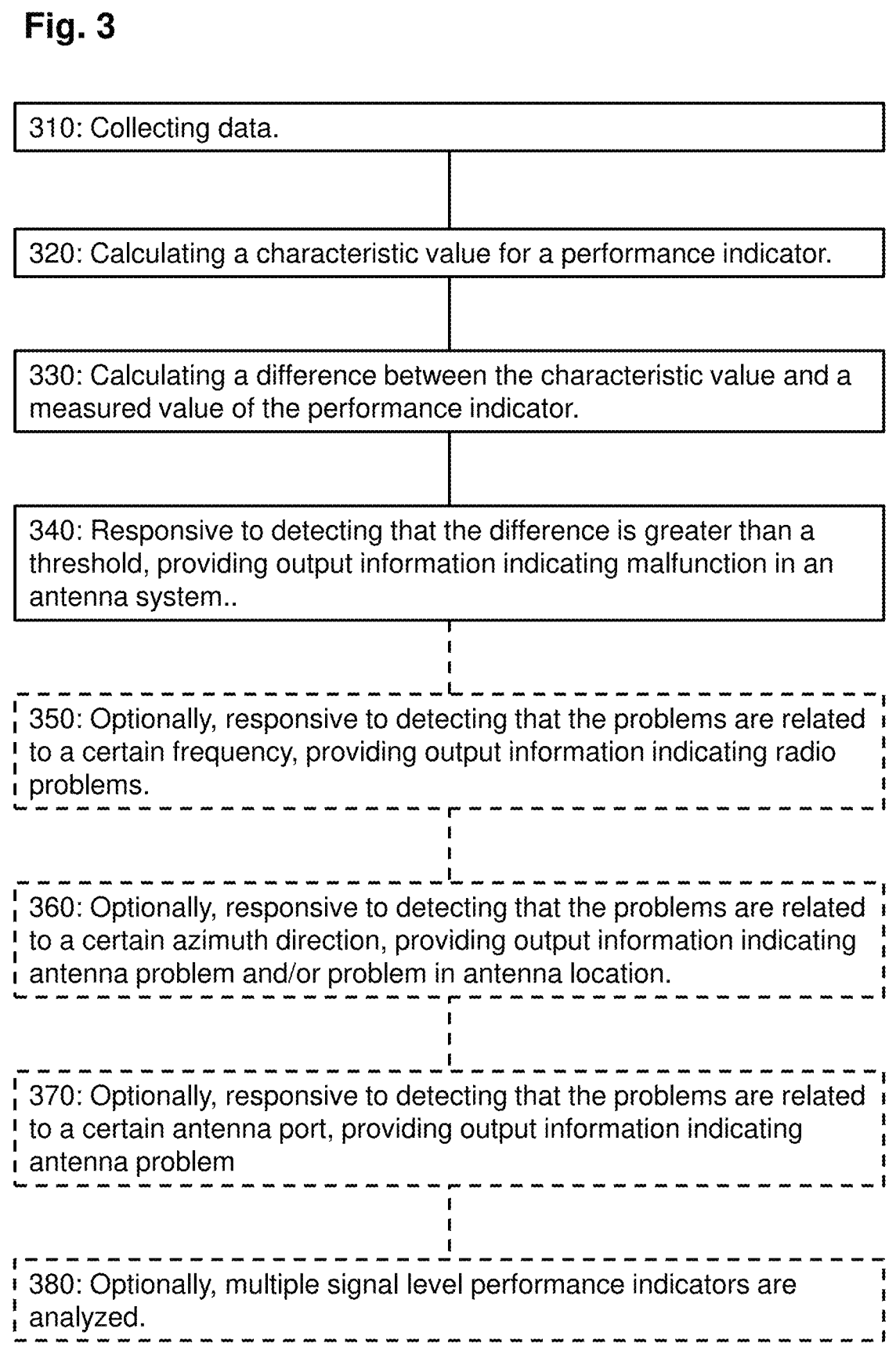

310: Collecting data.

320: Calculating a characteristic value for a performance indicator.

330: Calculating a difference between the characteristic value and a measured value of the performance indicator.

340: Responsive to detecting that the difference is greater than a threshold, providing output information indicating malfunction in an antenna system..

350: Optionally, responsive to detecting that the problems are related to a certain frequency, providing output information indicating radio problems.

360: Optionally, responsive to detecting that the problems are related to a certain azimuth direction, providing output information indicating antenna problem and/or problem in antenna location.

370: Optionally, responsive to detecting that the problems are related to a certain antenna port, providing output information indicating antenna problem 380: Optionally, multiple signal level performance indicators are analyzed.

COMPUTER IMPLEMENTED METHOD FOR ANALYZING OPERATION OF A CELL OF A COMMUNICATIONS NETWORK

TECHNICAL FIELD

The present disclosure generally relates to analyzing operation of cells in communications networks. The disclosure relates particularly, though not exclusively, to analyzing operation of antenna systems of the cells.

BACKGROUND

This section illustrates useful background information without admission of any technique described herein representative of the state of the art.

Cellular communication networks comprise a plurality of cells serving users of the network. When users of the communication network move in the area of the network, connections of the users are seamlessly handed over between cells of the network. In order to the communication network to operate as intended, cells of the communication network need to provide sufficient coverage without too much interfering with operation of neighboring cells.

Antennas and their radiation patterns are one important factor affecting operation of cellular networks. Networks are designed based on the assumption that antennas, and likewise other network components, behave according to their specifications. Unfortunately, this is not always the case.

There are various automated measures that monitor operation of the communication networks in order to detect any problems in operation of the network as soon as possible so that corrective actions can be taken. The challenge is that there are malfunctions that are not detected by current automated monitoring arrangements and therefore there is room for further development of the automated monitoring arrangements.

Now a new approach is taken to analyzing operation of antenna systems in communication networks.

SUMMARY

The appended claims define the scope of protection. Any examples and technical descriptions of apparatuses, products and/or methods in the description and/or drawings not covered by the claims are presented not as embodiments of the present disclosure but as background art or examples useful for understanding the present disclosure.

According to a first example aspect there is provided a computer implemented method for analyzing operation of a cell of a communications network. The method comprises collecting data comprising measurement samples of signal level performance indicators from multiple cells of the communications network; calculating a characteristic value for a signal level performance indicator for a first cell type based on the collected data, wherein a part of the best measurement samples of the signal level performance indicator of the first cell type are taken into account in the calculation of the characteristic value; calculating a difference between the calculated characteristic value and a measurement samples of the signal level performance indicator of a first cell of the first cell type; and providing output information indicating that an antenna system of the first cell is operating incorrectly in response to detecting that the calculated difference is greater than a preset threshold.

In an example embodiment, the method further comprises calculating multiple differences between multiple characteristic values and multiple measurement samples of signal level performance indicator of a first cell of the first cell type obtained for multiple distances from the base station; and providing output information (340) indicating that an antenna system of the first cell is operating incorrectly in response to detecting that several of the multiple calculated differences are greater than the preset threshold.

In an example embodiment, 5-15% or 10% of the best measurement samples of the signal level performance indicator are taken into account in the calculation of the characteristic value.

In an example embodiment, the characteristic value is an average of the measurement samples of the signal level performance indicator.

In an example embodiment, the characteristic value is obtained by fitting a non-linear curve to the measurement samples of the signal level performance indicator.

In an example embodiment, the signal level performance indicator is reference signal received power (RSRP) or channel quality indicator (CQ).

In an example embodiment, the preset threshold is an absolute value or a relative value proportional to the characteristic value.

In an example embodiment, the method further comprises: in response to detecting that the calculated difference surpasses the preset threshold only for a certain frequency band, providing output information indicating an incorrectly operating radio in the antenna system of the first cell.

In an example embodiment, the method further comprises: in response to detecting that the calculated difference surpasses the preset threshold only for a certain antenna azimuth direction, providing output information indicating an incorrectly operating antenna in the antenna system of the first cell and/or an incorrectly placed antenna.

In an example embodiment, the method further comprises: in response to detecting that the calculated difference surpasses the preset threshold only for a certain antenna port, providing output information indicating an incorrectly operating antenna in the antenna system of the first cell.

In an example embodiment, the analysis is performed daily or weekly or monthly or within other fixed time intervals.

In an example embodiment, the analysis is performed separately for different cell types comprising GSM900, LTE800, LTE1800, LTE2100, LTE2600 and/or 5G.

In an example embodiment, the first cell type comprises cells comprising an antenna system comprising an antenna within a preset height difference compared to a height of an antenna of the first cell.

In an example embodiment, the analysis is performed simultaneously for multiple different signal level performance indicators comprising any of: reference signal received power (RSRP), reference signal received quality (RSRQ), received signal strength indicator (RSSI), signal to noise ratio (SNR), signal to interference plus noise ratio (SINR), and received signal code power (RSCP), channel quality indicator (CQ), and timing advance (TA) indicator.

According to a second example aspect of the present disclosure, there is provided an apparatus comprising a processor and a memory including computer program code; the memory and the computer program code configured to, with the processor, cause the apparatus to perform the method of the first aspect or any related embodiment.

According to a third example aspect of the present disclosure, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of the first aspect or any related embodiment.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIG. 3 shows a flow chart according to certain example embodiments; and

DETAILED DESCRIPTION

In the following description, like reference signs denote like elements or steps.

Example embodiments of the present disclosure provide new mechanisms to analyze operation of cells of communication networks in order to find antenna related problems and/or in order to distinguish whether there is an antenna problem or a radio problem. There may be for example faulty components in antenna lines (e.g. faulty connectors, faulty antenna dipoles etc.), external obstacles causing problems in antenna operation, faulty radiation patterns etc. All of these may cause problems with performance of the network e.g. by causing problems with throughput, dominance areas, and/or handovers.

Certain example embodiments of the present disclosure are based on comparing performance data related to different network technologies served by the same base station site to identify potential antenna problems. If cells of different network technologies use the same physical antenna components, the different network technologies should show similar problems, if there is a problem in the antenna.

Figure 1:
FIG. 1 schematically shows an antenna system according to an example embodiment.

FIG. 1 shows an example antenna system 100 comprising an antenna element 110, antenna ports 120, 130, 140 and 150, and radio transceivers 160 and 170. Each port relates to an antenna line comprising connectors, antenna dipoles and other physical components. One antenna line may serve one or more cells operating according to different network technologies. For example, antenna port 120 may serve GSM900 and LTE800 technologies, and antenna port 140 may serve LTE1800 and LTE2600 technologies.

Now if performance data related to GSM900 and LTE800 indicate substantially similar antenna related problem, it is likely that there may be for example a faulty component in the antenna line of antenna port 120 or some other problem with the antenna line of antenna port 120. In such case, automatic analysis according to an example embodiment outputs an indication of an antenna problem in antenna line associated with the antenna port 120. Likewise, if performance data related to cells using different ports of the antenna element 110 indicate substantially similar antenna related problem, it is likely that the whole antenna element is faulty or wrongly installed, and an indication of an antenna problem in the whole antenna element 110 may be output. Furthermore, if performance data indicate problems with LTE2600 while LTE1800 is operating normally, antenna problem is not possible because both use the same antenna elements, so that an output indicating a radio problem is provided.

It is to be noted that in the following, mainly monitoring of a single base station site is discussed, however, as is evident from the following, plurality of base station sites may be monitored correspondingly in parallel or sequentially one after another.

Figure 2A:
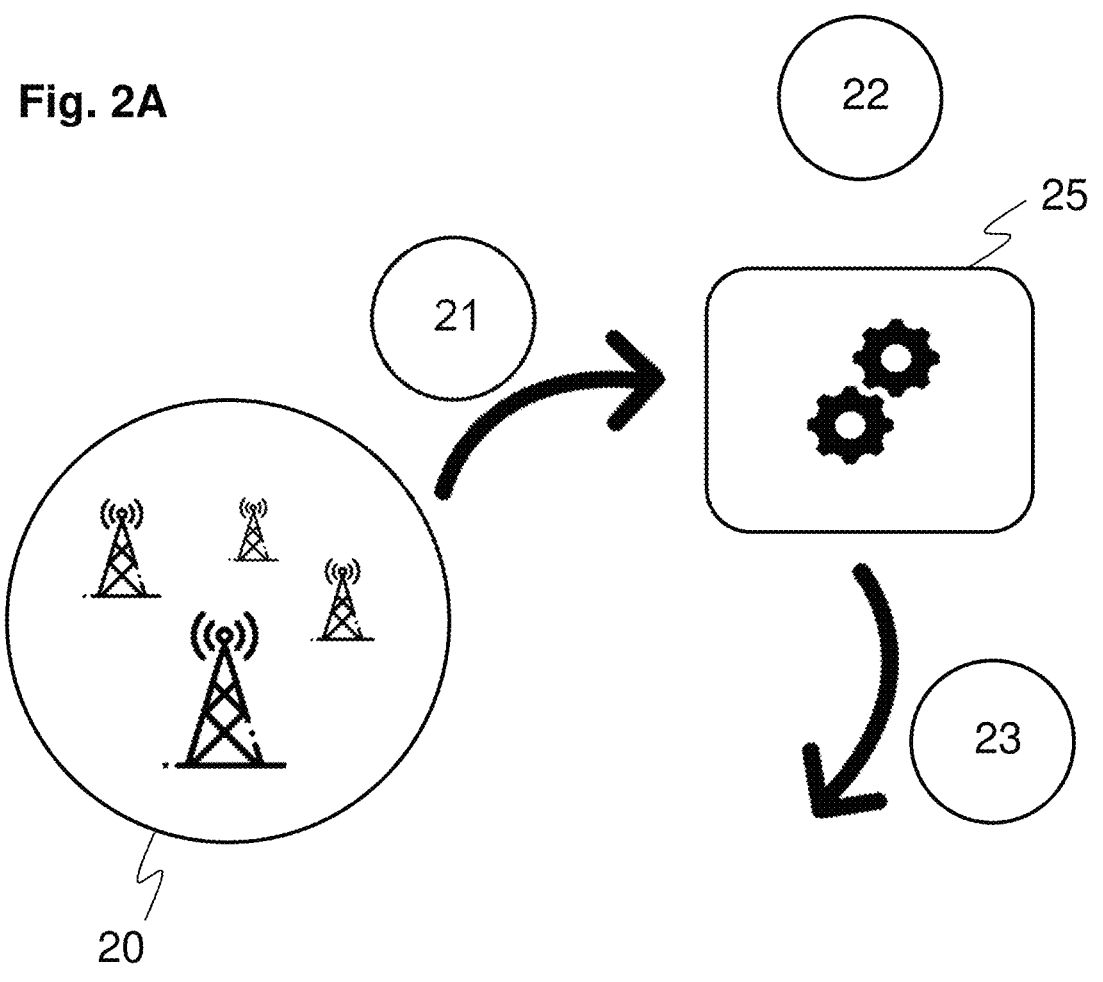
FIG. 2A shows an example scenario according to an embodiment.

FIG. 2A shows an example scenario according to an embodiment. The scenario shows a communication network 20 comprising a plurality of cells and base station sites and other network devices, and an automation system 25 configured to implement automatic monitoring according to example embodiments.

In an embodiment of the present disclosure the scenario of FIG. 2A operates as follows: In phase 21, the automation system 25 obtains performance data from a cells of a base station site of the network. In an embodiment the data comprises at least information relating to signal level performance indicators. The performance data may comprise information about signal level received at the user devices and/or information about transmission signal level used by the user devices. Further the performance data may comprise information relating to distance of user devices from the base station site. The data may be obtained directly from the cells or through some intermediate system. Also other data may be obtained from the cells.

In phase 22, the automation system 25 uses the received performance data to monitor and analyze operation of the cells to detect problems in operation of, e.g., one or more antenna lines, antenna components, or radio transceivers of the base station site.

In phase 23, any determined problems are output for further actions such as for example maintenance of the base station site.

The process may be manually or automatically triggered. The process may be periodically repeated. The process may be repeated for example once a day, every other day, every three days, once a week, every two weeks, once a month, or seasonally. By periodically repeating the process, effective network monitoring is achieved and problems, if any, may be timely detected. Additionally or alternatively, the process may be triggered, for example, in response to observing a performance problem or degradation in the network or in a particular area or cell. Still further, the process may be performed in connection with deployment of new cells or base station site, deployment of new physical equipment in the base station site and/or maintenance actions performed in the base station site. In this way any problems with the newly deployed equipment may be detected right away.

Figure 2B:
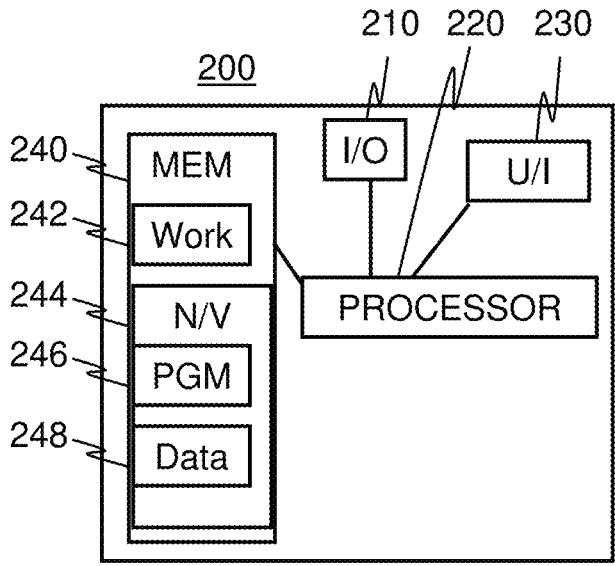
FIG. 2B shows a block diagram of an apparatus according to an embodiment.

FIG. 2B shows a block diagram of an apparatus 200 according to an example embodiment. The apparatus 200 comprises a communication interface 210; a processor 220; a user interface 230; and a memory 240.

The communication interface 210 comprises in an embodiment a wired and/or wireless communication circuitry, such as Ethernet; Wireless LAN; Bluetooth; GSM; CDMA; WCDMA; LTE; and/or 5G circuitry. The communication interface can be integrated in the apparatus 200 or provided as a part of an adapter, card or the like, that is attachable to the apparatus 200. The communication interface 210 may support one or more different communication technologies. The apparatus 200 may also or alternatively comprise more than one of the communication interfaces 210.

The processor 220 may be a central processing unit (CPU), a microprocessor, a digital signal processor (DSP), a graphics processing unit, an application specific integrated circuit (ASIC), a field programmable gate array, a microcontroller or a combination of such elements.

The user interface may comprise a circuitry for receiving input from a user of the apparatus 200, e.g., via a keyboard, graphical user interface shown on the display of the apparatus 200, speech recognition circuitry, or an accessory device, such as a headset, and for providing output to the user via, e.g., a graphical user interface or a loudspeaker.

The memory 240 comprises a work memory 242 and a persistent memory 244 configured to store computer program code 246 and data 248. The memory 240 may comprise any one or more of: a read-only memory (ROM); a programmable read-only memory (PROM); an erasable programmable read-only memory (EPROM); a random-access memory (RAM); a flash memory; a data disk; an optical storage; a magnetic storage; a smart card; a solid state drive (SSD); or the like. The apparatus 200 may comprise a plurality of the memories 240. The memory 240 may be constructed as a part of the apparatus 200 or as an attachment to be inserted into a slot, port, or the like of the apparatus 200 by a user or by another person or by a robot. The memory 240 may serve the sole purpose of storing data, or be constructed as a part of an apparatus 200 serving other purposes, such as processing data.

A skilled person appreciates that in addition to the elements shown in FIG. 2B, the apparatus 200 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus 200 when external power if external power supply is not available.

FIG. 3 shows a flow chart according to certain example embodiments. The methods may be implemented in the automation system 25 of FIG. 2A and/or in the apparatus 200 of FIG. 2B. The methods are implemented in a computer and do not require human interaction unless otherwise expressly stated. It is to be noted that the methods may however provide output that may be further processed by humans and/or the methods may require user input to start. Different phases shown in FIG. 3 may be combined with each other and the order of phases may be changed except where otherwise explicitly defined. Furthermore, it is to be noted that performing all phases of the flow charts is not mandatory.

FIG. 3 illustrates a process for analyzing operation of a cell of a communications network comprising various possible steps including some optional steps while also further steps can be included and/or some of the steps can be performed more than once:

310: Collecting data comprising measurement samples of signal level performance indicators from multiple cells of the communications network. The collected data may further comprise network configuration information. The data may be collected from selected cells or from all the cells of the communications network. In an embodiment, the signal level performance indicator data may comprise one or several of: reference signal received power (RSRP), reference signal received quality (RSRQ), received signal strength indicator (RSSI), signal to noise ratio (SNR), signal to interference plus noise ratio (SINR), received signal code power (RSCP), channel quality indicator (CQ), or timing advance (TA) indicator. The network configuration information may comprise e.g. base station locations, used cell technologies, antenna directions, antenna heights and other data related to the base stations and/or cells of the network.

320: Calculating a characteristic value for a signal level performance indicator for a first cell type based on the collected data. In an embodiment, the cell type may comprise GSM900, LTE800, LTE1800, LTE2100, LTE2600 or 5G technologies. In an embodiment, the cell type may comprise cells comprising an antenna at predefined height regime. In an example embodiment, the cell type may comprise any other characteristic feature of the cells of a communications network.

In an embodiment, multiple characteristic values for different distances from a base station are calculated. In an embodiment, distance from a base station is accounted for in the calculation of the characteristic value such that, for any given distance, the characteristic value is calculated from measurement samples which are obtained from preset regime around that distance. In an embodiment a part of the best measurement samples of the first cell type are taken into account in the calculation of the characteristic value for the signal level performance indicator. In an example embodiment, the signal level performance indicator is reference signal received power (RSRP). In some example embodiments, 10%, or 5-15% of the best measurement samples of the signal level performance indicator are taken into account in the calculation of the characteristic value. In an example embodiment, the characteristic value is calculated as an average of the samples. In another example, the characteristic value is calculated as a weighted average of the samples. In a further embodiment, the characteristic value is calculated using any standard curve fitting method.

330: Calculating a difference between the calculated characteristic value and a measurement sample of signal level performance indicator of a first cell of the first cell type. The difference may include the sign of the difference or it may be an absolute value of the difference. Optionally, multiple differences may be calculated for multiple characteristic values and multiple measurement samples of signal level performance indicator obtained for multiple distances from the base station.

340: Providing output information indicating that an antenna system of the first cell is operating incorrectly in response to detecting that the calculated difference is greater than a preset threshold. Optionally, output information indicating malfunction is provided in response to detecting that threshold is triggered by multiple measurement samples of the signal level performance indicator of the first cell at different distances from the base station. In an embodiment, the preset threshold is an absolute or a fixed value. In another embodiment the preset threshold is a relative value proportional to the characteristic value and/or distance from a base station. The output information may comprise cell identification, antenna system identification, antenna identification, radio identification, antenna port identification, antenna line identification, malfunction identification, and/or any other data enabling to identify and locate a problem in a cell or cells.

350: Optionally, responsive to detecting that the problems are related to a certain frequency, providing output information indicating radio transceiver problems. In an embodiment, if the problems are related to a certain frequency or a certain frequency band and multiple cells using the same radio are suffering the same problem, a radio problem is indicated.

360: Optionally, responsive to detecting that the problems are related to a certain azimuth direction, providing output information indicating antenna problem and/or problem in antenna location. In an embodiment, if the problems are related to a certain antenna azimuth direction and multiple cells using the same antenna are suffering the same problem, problem in antenna or antenna placing is indicated.

370: Optionally, responsive to detecting that the problems are related to a certain antenna port, providing output information indicating antenna problem. In an embodiment, if the problems are related to a certain antenna port and all the cells using the same port are suffering problems, an antenna port problem is indicated.

380: Optionally, multiple different signal level performance indicators are analyzed. In an embodiment, steps 310-370 are performed simultaneously or successively for multiple different signal level performance indicators comprising any of: reference signal received power (RSRP), reference signal received quality (RSRQ), received signal strength indicator (RSSI), signal to noise ratio (SNR), signal to interference plus noise ratio (SINR), received signal code power (RSCP), channel quality indicator (CQ), and timing advance (TA) indicator. In a further embodiment, multiple different signal level indicators measured at multiple different distances from a base station may be analyzed.

The method may be repeated daily, weekly, monthly, or any other time interval. In an embodiment, it is repeated according season of the year to account for e.g. trees with or without leaves, or snow.

Figure 4:
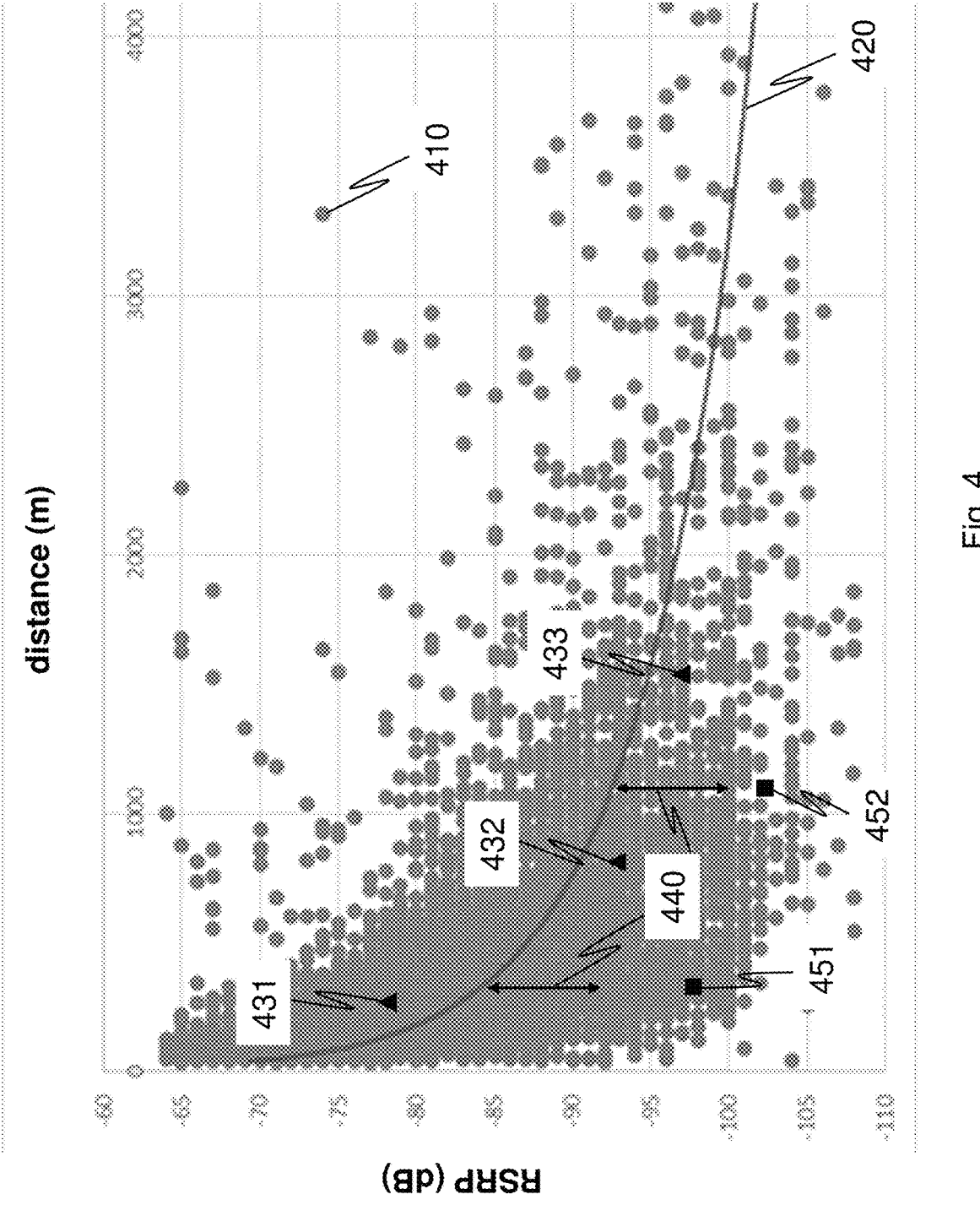
FIG. 4 shows an example embodiment related to RSRP performance indicator.

FIG. 4 shows an example embodiment related to RSRP performance indicator. The vertical axis shows signal strength RSRP value and the horizontal axis distance from a base station. Dots 410 (only one indicated with reference numeral for clarity) are measurement samples of signal strength indicator RSRP from multiple cells of a communication network. Solid curve 420 shows a calculated characteristic value for RSRP as function of distance from a base station. In this example calculation, best 10% of the measurement samples, i.e. highest RSRP values, are taken into account. The curve 420 of characteristic values may be calculated as an average, weighted average or moving average of the samples. In some embodiments, linear or non-linear curve fitting may be performed using standard methods comprising e.g. least-squares fitting and regression analysis. Arrows 440 indicate the preset threshold. Triangles 431-433 and squares 451-452 indicate example measurement values of RSRP of the first cell, i.e., measurement samples from the cell whose operation is analyzed. Example measurement values 431-433 indicated with triangles are within the threshold 440 from the characteristic curve 420. In contrast, example measurement values 451-452 indicated with squares differ more than the threshold 440 from the characteristic curve 420 so that output indicating a malfunction in an antenna system of the first cell is provided.

The embodiments provide automated methods for analyzing operation of a cell of a communications network. An advantage provided by the embodiments is that different sources of problems in an antenna system may be identified with single method. The method may identify problems e.g. in antenna elements, in antenna ports, or in radio transceivers. Another advantage is that problems not caused by the cell operation, i.e., originating from the user behavior may be filtered out. This is because bad measurement samples that may arise e.g. due to users being e.g. inside of thick concrete walls, in some other place of weak signal coverage, or shadow region, are not accounted for in the calculations of the characteristic values. That is, best measurement samples are taken into account and worst samples are ignored. A further advantage is that embodiments of the present disclosure may help finding also partially operating or partially malfunctioning antenna systems due to being able to analyze e.g. different technologies, different frequency bands, different azimuths, or different distances separately or jointly. An advantage is also that problems may be found more accurately and faster so that false or unnecessary field work can be avoided.

Still further, improved analysis is achieved by looking specifically at the best measurement samples. The reason for this is that the methods of some embodiments are able to identify situations where even the best measurement samples are not very good. Such situation may be an indication of malfunctioning antenna or of some physical obstacle hindering operation of the antenna. Such situation is nevertheless not likely to trigger any conventional performance alarms that usually trigger when sufficiently bad samples are identified.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the present disclosure. It is however clear to a person skilled in the art that the present disclosure is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the present disclosure, and not in limitation thereof. Hence, the scope of the present disclosure is only restricted by the appended patent claims.

The invention claimed is:

1. A computer implemented method for analyzing operation of a cell of a communications network, the method comprising:

collecting data comprising measurement samples of signal level performance indicators from multiple cells of the communications network;

calculating a characteristic value for a signal level performance indicator for a first cell type based on the collected data, wherein a part of best measurement samples of the signal level performance indicator of the first cell type are taken into account in the calculation of the characteristic value;

calculating a difference between the calculated characteristic value and a measurement sample of signal level performance indicator of a first cell of the first cell type; and providing output information indicating that an antenna system of the first cell is operating incorrectly in response to detecting that the calculated difference is greater than a preset threshold.

2. The method of claim 1, further comprising:

calculating multiple differences between multiple characteristic values and multiple measurement samples of signal level performance indicator of a first cell of the first cell type obtained for multiple distances from the base station; and providing output information indicating that an antenna system of the first cell is operating incorrectly in response to detecting that several of the multiple calculated differences are greater than the preset threshold.

3. The method of claim 1, wherein 5-15% or 10% of the best measurement samples of the signal level performance indicator are taken into account in the calculation of the characteristic value.

4. The method of claim 1, wherein the characteristic value is an average of the measurement samples of the signal level performance indicator.

5. The method of claim 1, wherein the characteristic value is obtained by fitting a non-linear curve to the measurement samples of the signal level performance indicator.

6. The method of claim 1, wherein the signal level performance indicator is reference signal received power, RSRP, or channel quality indicator, CQI.

7. The method of claim 1, wherein the preset threshold is an absolute value or a relative value proportional to the characteristic value.

8. The method of claim 1 further comprising:

in response to detecting that the calculated difference surpasses the preset threshold only for a certain frequency band, providing output information indicating an incorrectly operating radio in the antenna system of the first cell.

9. The method of claim 1 further comprising:

in response to detecting that the calculated difference surpasses the preset threshold only for a certain antenna azimuth direction, providing output information indicating an incorrectly operating antenna in the antenna system of the first cell and/or an incorrectly placed antenna.

10. The method of claim 1 further comprising:

in response to detecting that the calculated difference surpasses the preset threshold only for a certain antenna port, providing output information indicating an incorrectly operating antenna in the antenna system of the first cell.

11. The method of claim 1, wherein the analysis is performed daily or weekly or monthly or within other fixed time intervals.

12. The method of claim 1, wherein the analysis is performed separately for different cell types comprising GSM900, LTE800, LTE1800, LTE2100, LTE2600 and/or 5G.

13. The method of claim 1, wherein the first cell type comprises cells comprising an antenna system comprising an antenna within a preset height difference compared to a height of an antenna of the first cell.

14. The method of claim 1, wherein the analysis is performed simultaneously for multiple different signal level performance indicators comprising any of:

reference signal received power, RSRP, reference signal received quality, RSRQ, received signal strength indicator, RSSI, signal to noise ratio, SNR, signal to interference plus noise ratio, SINR, received signal code power, RSCP, channel quality indicator, CQI, and timing advance, TA, indicator.

15. An apparatus comprising:

a processor, and a memory including computer program code; the memory and the computer program code configured to, with the processor-, cause the apparatus to perform analyzing operation of a cell of a communications network by:

collecting data comprising measurement samples of signal level performance indicators from multiple cells of the communications network;

calculating a characteristic value for a signal level performance indicator for a first cell type based on the collected data, wherein a part of the best measurement samples of the signal level performance indicator of the first cell type are taken into account in the calculation of the characteristic value;

calculating a difference between the calculated characteristic value and a measurement sample of signal level performance indicator of a first cell of the first cell type; and providing output information indicating that an antenna system of the first cell is operating incorrectly in response to detecting that the calculated difference is greater than a preset threshold.

16. A computer program product comprising non-transitory computer executable program code which when executed by a processor of an apparatus causes the apparatus to perform analyzing operation of a cell of a communications network by:

collecting data comprising measurement samples of signal level performance indicators from multiple cells of the communications network;

calculating a characteristic value for a signal level performance indicator for a first cell type based on the collected data, wherein a part of best measurement samples of the signal level performance indicator of the first cell type are taken into account in the calculation of the characteristic value;

calculating a difference between the calculated characteristic value and a measurement sample of signal level performance indicator of a first cell of the first cell type; and providing output information indicating that an antenna system of the first cell is operating incorrectly in response to detecting that the calculated difference is greater than a preset threshold.

17. The method of claim 1, wherein 10% of the best measurement samples of the signal level performance indicator are taken into account in the calculation of the characteristic value.

18. The apparatus of claim 16, wherein the memory and the computer program code are configured to, with the processor, cause the apparatus to further perform:

calculating multiple differences between multiple characteristic values and multiple measurement samples of signal level performance indicator of a first cell of the first cell type obtained for multiple distances from the base station; and providing output information indicating that an antenna system of the first cell is operating incorrectly in response to detecting that several of the multiple calculated differences are greater than the preset threshold.

\*   \*   \*   \*   \*